United States Patent Office 3,092,635
Patented June 4, 1963

3,092,635
PROCESS FOR THE PREPARATION OF CRYSTAL-LIZED COMPOUNDS OF PYRROLIDINO-METH-YL-TETRACYCLINE
Walter Siedel, Bad Soden (Taunus), Alfons Söder, Frankfurt am Main, and Willi Scheurich, Bad Soden (Taunus), Germany, assignors to Farbwerke Hoechst Aktiengesellschaft vormals Meister Lucius & Brüning, Frankfurt am Main, Germany, a corporation of Germany
No Drawing. Filed June 3, 1959, Ser. No. 817,741
Claims priority, application Germany June 6, 1958
7 Claims. (Cl. 260—326.3)

We have found a process disclosed in copending U.S. application Serial No. 686,297, filed September 26, 1957, now abandoned, which allows of preparing crystalline compounds of pyrrolidino-methyl-tetracycline, and which comprises subjecting a suspension of crystalline pyrrolidino-methyl-tetracycline in an organic medium selected from the group consisting of alphatic, cycloaliphatic, aromatic hydrocarbons and halogenated aliphatic, cycloaliphatic and aromatic hydrocarbons, as well as of nitromethane and nitrobenzene, to the action of a solution of an acid selected from the group consisting of citric acid, tartaric acid, malic acid, malonic acid, succinic acid and cinnamic acid, in a solvent selected from the group consisting of ethyl ether, ethyl acetate, acetone, methyl-ethylketone, dioxane, tetrahydrofurane and lower alcohols such as methanol, ethanol, propanol and a mixture of these alcohols.

It is surprising that by suspending crystallized pyrrolidino-methyl-tetracycline in certain specific organic agents which are liquid at room temperature, it is made possible to cause the acid added in the form of a solution to react on the crystal surface of the pyrrolidino-methyl-tetracycline in forming a salt, or to penetrate into the crystal lattice.

As organic dispersing media for the pyrrolidino-methyl-tetracycline which promote simultaneously the salt formation in crystallized state, there proved to be suitable: aliphatic hydrocarbons such as hexane and homologues, furthermore cycloaliphatic hydrocarbons such as cyclohexane and its derivatives, aromatic hydrocarbons such as benzene, toluene and xylene, halogenated aliphatic hydrocarbons such as methylene chloride, choloform, carbon tetrachloride, ethylene dichloride, ethylbromide, halogenated aromatic hydrocarbons such as chlorobenzene and bromobenzene as well as nitromethane and nitrobenzene.

By allowing a solution of, for example, citric acid in acetone to act on a suspension of pyrrolidino-methyl-tetracycline in one of said dispersing media, the total quantity of citric acid deposits on the crystal surface or enters the crystal lattice of the pyrrolidino-methyl-tetracycline, and it cannot be removed therefrom even by multiple washing of the crystals with, for example, acetone or ether, due to the fact that a salt has formed.

If the same experiment is carried out with another dispersing agent for pyrrolidino-methyl-tetracycline, for example, ethyl ether or cyclic ethers such as tetrahydrofurane and dioxane, or aliphatic and cycloaliphatic alcohols, acetone or ethylacetate and other acid esters, no salt of pyrrolidino-methyl-tetracycline is formed with for example, citric acid, tartaric acid, malic acid, malonic acid, succinic acid or cinnamic acid. Insignificant amounts of, for example, citric acid which are adsorptively retained can be easily removed from the crystals by washing with ether or acetone.

It proved not to be immaterial with what organic solvent the citric acid for example forms a solution which is introduced into the suspension of the pyrrolidino-methyl-tetracycline. A prerequisite for the formation of crystalline salts with the pyrrolidino-methyl-tetracycline crystals is, that, for example, the citric acid must be easily soluble in the solvent in which it shall be dissolved, and that it must be difficultly soluble in the mixture of dispersing agent and solvent which remains behind after the reaction. The solubility of, for example, citric acid in that mixture shall suitably not exceed 0.3%.

The temperature, at which the reaction is to be carried out, shall preferably amount to 10–30° C., but the reaction succeeds even at lower as well as at higher temperatures.

The amount of organic acid to be reacted with the crystallized pyrrolidino-methyl-tetracycline can vary. If, for example, 1 mol of pyrrolidino-methyl-tetracycline is reacted with ⅓ mol of citric acid (=1 equivalent), the pH-value of the aqueous solution of the final product falls to about 5.6–5.8, as compared to that of the aqueous solution of the pyrrolidino-methyl-tetracycline which amounts to 7.9–8.0. By addition of further amounts of, for example, citric acid, the pH-value of the aqueous solution of the final product is further reduced.

The products of the present invention constitute valuable medicaments which are distinguished by a very high and very rapid solubility in water. In contrast to the free tetracyclines, they are very resistant to the action of atmospheric oxygen.

The following examples illustrate the invention, but they are not intended to limit it thereto.

*Example 1*

*Pyrrolidino-methyl-tetracycline-citrate.*—10.6 grams of crystalline pyrrolidino-methyl-tetracycline are suspended in 150 cc. of methylene chloride and to this suspension is added dropwise, while stirring, a solution of 1.28 grams of anhydrous citric acid in 10 cc. of acetone plus 10 cc. of methylene chloride. The whole is then stirred for an additional hour, the crystallisate is filtered off by suction and, after washing with methylene chloride and ether, dried in vacuo.

There are obtained 11.8 grams of final product; its aqueous solution has a pH-value of about 5.6 to 5.8. The reaction product constitutes yellow needles softening at 145° C.; M.P. with decomposition: 160–164° C. $(\alpha)_D^{24°} = -172.2°$ (2% solution in redistilled water).

Instead of dissolving the citric acid in acetone, it can also be dissolved in ether, ethyl acetate, dioxane, tetrahydrofurane, ethanol or methyl-ethyl ketone, and then introduced into the above-mentioned suspension of pyrrolidino-methyl-tetracycline. Instead of methylene chloride, there can be used as suspending agents also hexane and alkylated hexanes or cycloaliphatic hydrocarbons such as cyclohexane and its derivatives, aromatic hydrocarbons such as benzene, toluene and xylene, chloroform, carbon tetrachloride, ethylene dichloride, ethyl bromide, chlorobenzene, bromobenzene, nitromethane or nitrobenzene.

*Example 2*

*Pyrrolidino-methyl-tetracycline-malate.*—One proceeds in the manner described in Example 1 but in using instead of the citric acid 1.35 grams of malic acid dissolved in acetone. The yield in final product amounts to 11.7 grams. The reaction product constitutes yellow needles softening at 145° C.; M.P. with decomposition: 153–155° C. $(\alpha)_D^{24°} = -176.2°$ (2% solution in redistilled water).

The aqueous solution of this product has a pH-value of 4.8.

As solvents for the acid besides acetone, all the solvents mentioned in Example 1 can also be used. As dispersing agents can be used all the agents mentioned in Example 1.

*Example 3*

*Pyrrolidino-methyl-tetracycline-tartrate.*—One proceeds in the manner described in Example 1 but in using instead of the citric acid 1.51 grams of tartaric acid dissolved in 10 cc. of acetone. The yield in final product amounts to 11.5 grams. The reaction product constitutes yellow needles softening at 153° C.; M.P. with decomposition: 157–160° C. $(\alpha)_D^{24°} = -168.8°$ (2% solution in redistilled water). The aqueous solution of this product has a pH-value of 5.4.

As solvents for the acid besides acetone, all the solvents mentioned in Example 1 can also be used. As dispersing agents can be used all the agents mentioned in Example 1.

Example 4

*Pyrrolidino - methyl - tetracycline-malonate.*—One proceeds in the manner described in Example 1 but in using instead of the citric acid 1.04 grams of malonic acid dissolved in 10 cc. of acetone. The yield in final product amounts to 11.5 grams. The reaction product constitutes yellow needles softening at 140°; M.P. with decomposition: 148–150° C. $(\alpha)_D^{24°} = -179.7°$ (2% solution in redistilled water). The aqueous solution of this product has a pH-value of 5.0.

As solvents for the acid besides acetone, all the solvents mentioned in Example 1 can also be used. As dispersing agents can be used all the agents mentioned in Example 1.

Example 5

*Pyrrolidino - methyl - tetracycline-succinate.*—One proceeds in the manner described in Example 1 but in using instead of the citric acid 1.19 grams of succinic acid dissolved in 10 cc. of acetone. The yield in final product amounts to 11.5 grams. The reaction product constitutes yellow needles softening at 140° C., M.P. with decomposition: 147° $(\alpha)_D^{24°} = -177.70$ (2% solution in redistilled water). The aqueous solution of this product has a pH-value of 6.0.

As solvents for the acid besides acetone, all the solvents mentioned in Example 1 can also be used. As dispersing agents can be used all the agents mentioned in Example 1.

Example 6

*Pyrrolidino - methyl-tetracycline-cinnamate.*—One proceeds in the manner described in Example 1 but in using instead of the citric acid 2.97 grams of cinnamic acid dissolved in 10 cc. of methanol, ethanol, dioxane or tetrahydrofurane, respectively. The yield in final product amounts to 13.0 grams. The reaction product constitutes yellow needles softening at 125°; M.P. with decomposition: 133–135° C. $(\alpha)_D^{24°} = -165.1°$ (2% solution in redistilled water).

All the dispersing agents mentioned in Example 1 can also be used.

We claim:

1. The process for the manufacture of crystalline compounds of pyrrolidino-methyl-tetracycline, which comprises subjecting a suspension of crystalline pyrrolidino-methyl-tetracycline in an organic dispersing medium selected from the group consisting of hexane, cyclohexane, benzene, toluene, xylene, methylene chloride, chloroform, carbon tetrachloride, ethylene dichloride, ethyl bromide, chlorobenzene, bromobenzene, nitromethane and nitrobenzene, to the action of a solution of an acid selected from the group consisting of citric acid, tartaric acid, malic acid, malonic acid, succinic acid and cinnamic acid in a solvent selected from the group consisting of ethyl ether, ethyl acetate, acetone, methylethyl ketone, dioxane, tetrahydrofurane, methanol, ethanol, propanol and mixtures of said alcohols.

2. A process for the preparation of crystalline pyrrolidino-methyl-tetracycline-citrate which comprises subjecting a suspension of crystalline pyrrolidino-methyl-tetracycline in methylene chloride to the action of a solution of citric acid in acetone.

3. A process for the preparation of crystalline pyrrolidino-methyl-tetracycline-malate which comprises subjecting a suspension of crystalline pyrrolidino-methyl-tetracycline in methylene chloride to the action of a solution of malic acid in acetone.

4. A process for the preparation of crystalline pyrrolidino-methyl-tetracycline-tartrate which comprises subjecting a suspension of crystalline pyrrolidino-methyl-tetracycline in methylene chloride to the action of a solution of tartaric acid in acetone.

5. A process for the preparation of crystalline pyrrolidino-methyl-tetracycline-malonate which comprises subjecting a suspension of crystalline pyrrolidino-methyl-tetracycline in methylene chloride to the action of a solution of malonic acid in acetone.

6. A process for the preparation of crystalline pyrrolidino-methyl-tetracycline-succinate which comprises subjecting a suspension of crystalline pyrrolidino-methyl-tetracycline in methylene chloride to the action of a solution of succinic acid in acetone.

7. A process for the preparation of crystalline pyrrolidino-methyl-tetracycline-cinnamate which comprises subjecting a suspension of crystalline pyrrolidino-methyl-tetracycline in methylene chloride to the action of a solution of cinnamic acid in methanol.

References Cited in the file of this patent

FOREIGN PATENTS

3169/57    Republic of South Africa ____ July 2, 1958

OTHER REFERENCES

Heinemann et al.: Abandoned U.S. patent application Serial No. 432,388, filed May 26, 1954, pages 17a–19 relied on.

Siedel et al.: Munchener Medizinische Wochenschrift, vol. 100, part 17, pages 661–63, Apr. 25, 1958.